(12) United States Patent
Ihrig

(10) Patent No.: US 11,335,178 B2
(45) Date of Patent: May 17, 2022

(54) PASSIVE INDOOR TRACKING SYSTEM AND METHOD WITH TREND CAPTURE AND DEVIATION ALERTS

(71) Applicant: MI Technical Solutions, Inc., Chesapeake, VA (US)

(72) Inventor: Michael L. Ihrig, Chesapeake, VA (US)

(73) Assignee: MI Technical Solutions, Inc., Chesapeake, VA (US)

( * ) Notice: Subject to any disclaimer, the term of this patent is extended or adjusted under 35 U.S.C. 154(b) by 34 days.

(21) Appl. No.: 17/072,522

(22) Filed: Oct. 16, 2020

(65) Prior Publication Data

US 2021/0125481 A1    Apr. 29, 2021

Related U.S. Application Data

(60) Provisional application No. 62/927,151, filed on Oct. 29, 2019.

(51) Int. Cl.
*G08B 21/04* (2006.01)
*H04B 17/318* (2015.01)

(52) U.S. Cl.
CPC ....... *G08B 21/0423* (2013.01); *H04B 17/318* (2015.01)

(58) Field of Classification Search
None
See application file for complete search history.

(56) References Cited

U.S. PATENT DOCUMENTS

2018/0367948 A1\* 12/2018 Bottazzi ............... H04W 4/023
2019/0158340 A1\*  5/2019 Zhang ................. H04B 17/318

\* cited by examiner

*Primary Examiner* — Adolf Dsouza
(74) *Attorney, Agent, or Firm* — Peter J. Van Bergen

(57) ABSTRACT

A system and method are provided for generating movement trends and alerts indicative of deviations therefrom associated with a person living in a residence. A transmitter co-located with the person generates a wireless signal. Receivers distributed throughout the residence generate RSSI values indicative of strength of the transmitter's wireless signal received thereby at each of a plurality of specified times during each day. A processor enables storage of each RSSI value associated with each of the specified times for a plurality of days such that a plurality of RSSI values are stored for each of the receivers. A trend RSSI value is generated by the processor for each of the receivers for each of the specified times by averaging the plurality of RSSI values so-stored for each receiver. An alert is generated by the processor when a subsequently-received RSSI value is indicative of a deviation from the trend RSSI value.

24 Claims, 3 Drawing Sheets

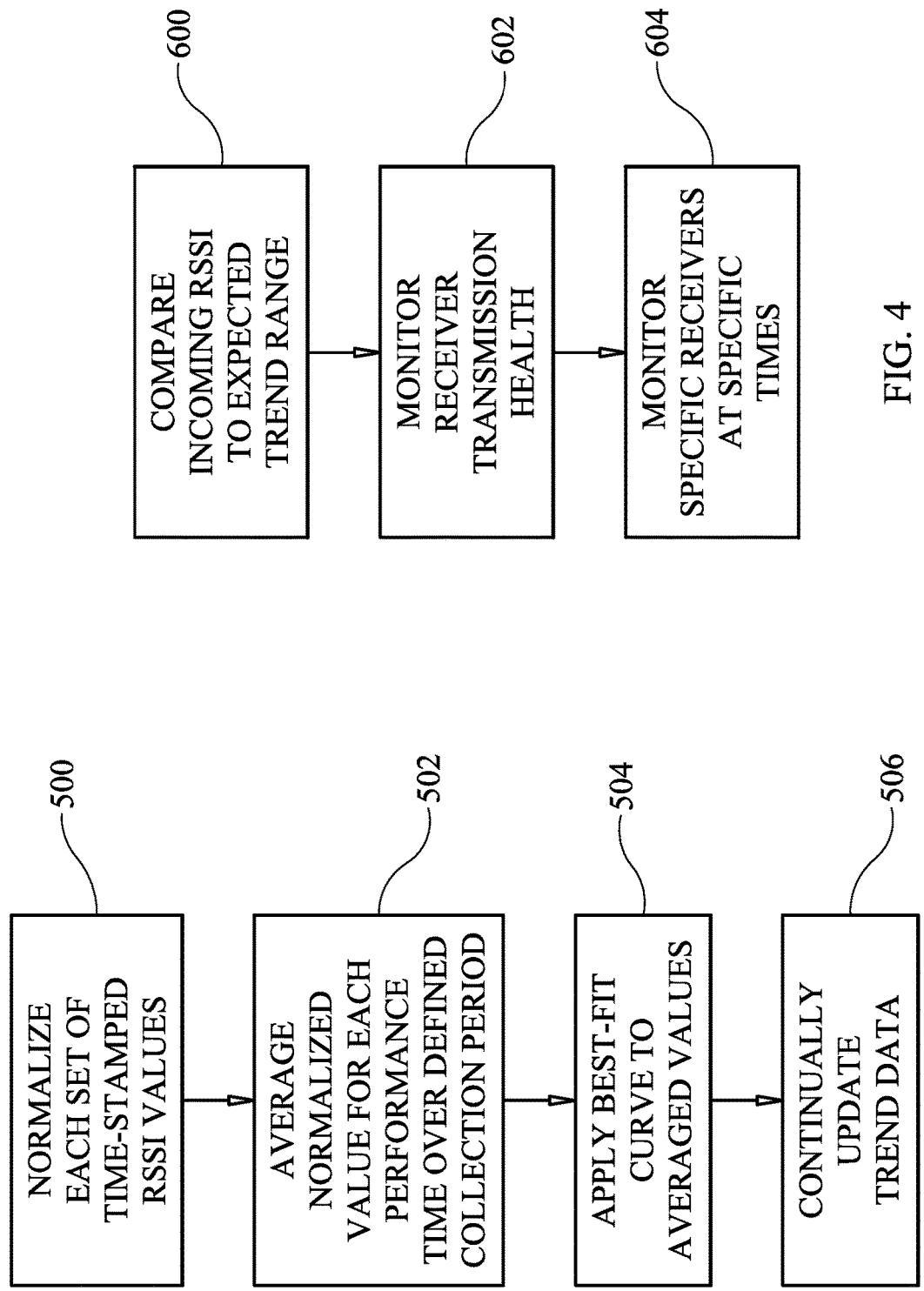

PASSIVE INDOOR TRACKING SYSTEM AND METHOD WITH TREND CAPTURE AND DEVIATION ALERTS

Pursuant to 35 U.S.C. § 119, the benefit of priority from provisional application 62/927,151, with a filing date of Oct. 29, 2019, is claimed for this non-provisional application.

FIELD OF THE INVENTION

The invention relates generally to in-home patient care, and more particularly to a system and method for passively tracking an individual's indoor movements to develop movement trends of the individual in order to issue alerts/notifications when there are deviations from the movement trends that may be indicative of a potential health care issue.

BACKGROUND OF THE INVENTION

Caring for aging, sick, and/or mentally or physically challenged friends or loved ones can be very time consuming and costly. Checking on someone we care about either personally or remotely (e.g., via phone call, text, email, etc.) is an active process that frequently gets done multiple times in a day. For the person performing a remote "check-in", this not only takes time but also can cause anxiety when the person being checked on does not respond. For the person being checked on, such frequent inquiries can be emotionally upsetting if they perceive they are no longer trusted to be able to care for themselves.

The option of professional in-home care or assisted living care can be very costly and not affordable for the family and/or friends who believe their loved one needs some kind of help. Further and once again, the person receiving the in-home or assisted living care might perceive either type of care as an affront to their autonomy adding to the stress of those being cared for as well as the caregivers.

A more affordable alternative can be found in the variety of commercially-available active alert systems that include a wearable "call button" that must be activated by a user to request assistance. While some of these wearable call-button types of systems include a fall-detecting accelerometer capable of passively activating a request for assistance, there are many more emergency or potential emergency situations that do not involve a fall event and/or that are not even recognized by the wearer of the call button.

SUMMARY OF THE INVENTION

Accordingly, it is an object of the present invention to provide a passive system and method that can alleviate the need for someone to routinely actively check on someone's welfare as well as the need for extensive in-home or assisted living care.

Another object of the present invention is to provide a passive system and method for in-home movement monitoring of a person for the purpose of continually determining movement trends and deviations therefrom that could be indicative of a health concern.

Still another object of the present invention is to provide a passive system and method for alerting one or more remote persons of a potential health care issue for a person predicated on deviations from the person's typical in-home movement and location trends.

Other objects and advantages of the present invention will become more obvious hereinafter in the specification and drawings.

In accordance with the present invention, a passive indoor tracking system and method are provided. The system and method generate movement trends and alerts indicative of deviations therefrom associated with a person living in a residence. The system includes a transmitter that is co-located with a person living in a residence. The transmitter generates an omnidirectional wireless signal. A plurality of receivers are disposed in and distributed throughout the residence. Each receiver generates a Received Signal Strength Indication (RSSI) value indicative of strength of the transmitter's wireless signal received thereby at each of a plurality of specified times during each day. A processor has a memory having computer readable instructions stored thereon. When executed by the processor, the computer readable instructions cause the processor to perform a number of steps. The steps include enabling storage of each RSSI value associated with each of the specified times for a plurality of days wherein a plurality of RSSI values are stored for each of the receivers. A trend RSSI value is generated by the processor for each of the receivers for each of the specified times by averaging the plurality of RSSI values so-stored for each receiver. An alert is generated by the processor when a subsequently-received RSSI value generated by at least one of the receivers following the plurality of days is indicative of a deviation from the trend RSSI value.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 3 is a flow diagram of process steps used to generate trend data in accordance with an embodiment of the present invention; and FIG. 4 is a diagram of operations that can be performed to generate deviation alerts in accordance with an embodiment of the present invention.

DETAILED DESCRIPTION OF THE INVENTION

Figure 1:
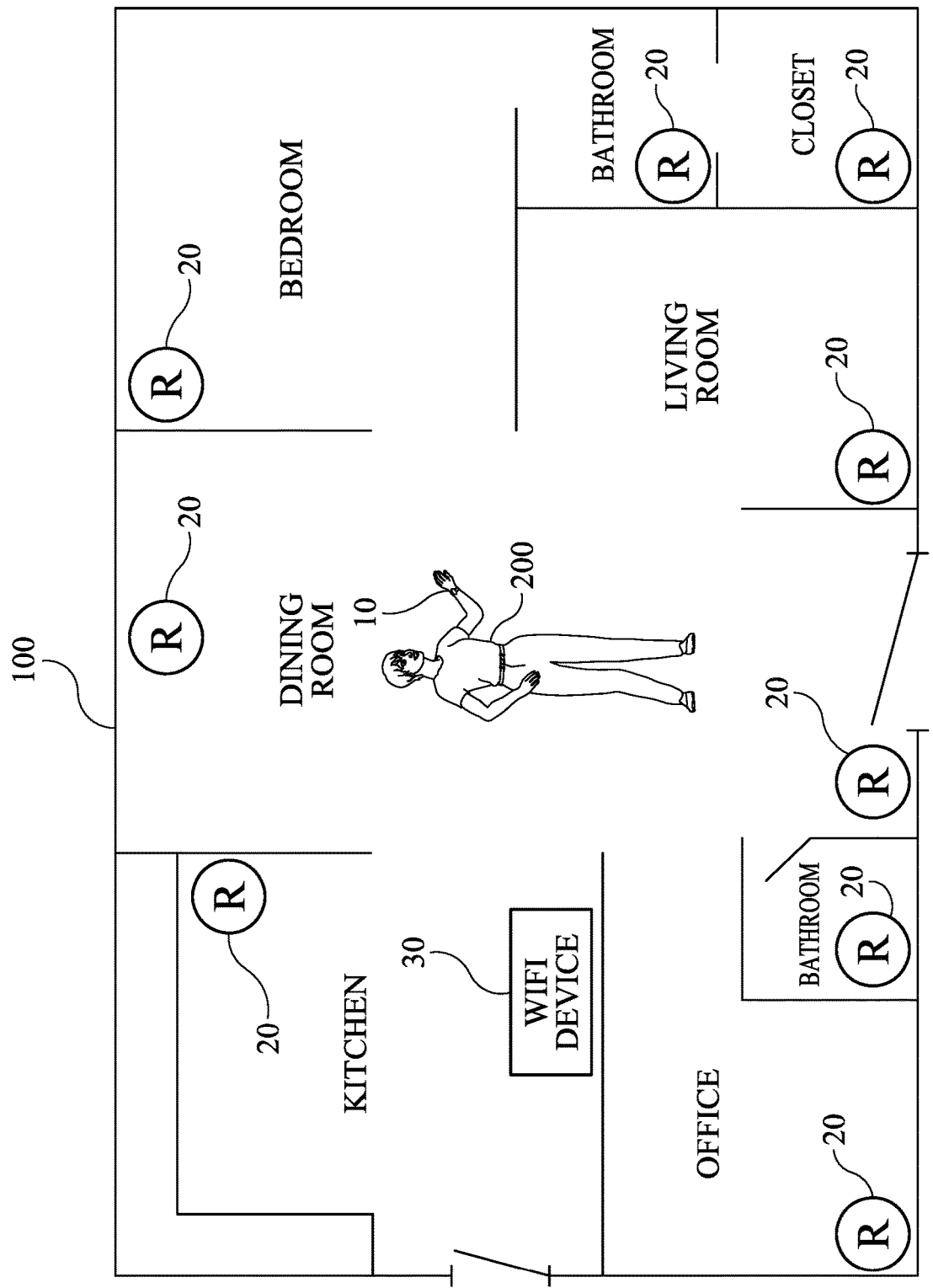
FIG. 1 is a plan view of living space in which a wearable beacon-generating device and a plurality of stationary receiving devices are located in accordance with an embodiment of the present invention.

Referring now to the drawings and more particularly to FIG. 1, a plan view of an exemplary living space is shown and is referenced generally by numeral 100. It is to be understood that the type, size, and/or configuration of living space 100 is not a limitation of the present invention. In general, living space 100 is representative of a residence occupied by a person 200 who is capable of moving about living space 100 as they desire either by walking or using an assistance device (e.g., walker, wheelchair, mechanized scooter, etc.). As will be explained further below, the present invention provides the means to passively monitor location and movement of person 200 throughout the day, develop and update location and movement trends, recognize when there is a deviation from the trends that could indicate a well-being concern, and send an alert notification to one or more remotely-located persons/devices when such a deviation is detected.

In accordance with the present invention, person 200 carries or wears (e.g., in the form of a necklace, wristband, ankle band, etc.) a low-powered transmitter or broadcast device 10 that continuously or periodically broadcasts an omnidirectional wireless signal at a defined transmission power within living space 100. By way of an illustrative example, broadcast device 10 can be a Bluetooth Low Energy (BLE) beacon-generating device. Regardless of how broadcast device 10 is carried or worn, it is assumed that device 10 is co-located with person 200 for all 24 hours in a day such that the location and movement of device 10 is coincident with that of person 200.

Broadcast device 10 is configured such that its signal strength will be strongest in the room where person 200 is located and will be weaker in rooms where person 200 is not located. That is, the signal strength of broadcast device 10 is constant, but the received signal strength at any given stationary receiver 20 is predicated on where person 200 is located at any given time such that the receivers' received signal strengths will vary in accordance with the movement of person 200 in living space 100.

The present invention also includes a plurality of stationary receivers ("R") 20 disposed throughout living space 100 at known locations. A receiver 20 can be positioned in each separate room or definable region of living space 100 such that there is always at least one receiver 20 within the receiving range of the signal output from broadcast device 10. It is to be understood that the number of receivers 20 needed (as well as their placement) for a living space will vary and is not a limitation of the present invention. In general, each of receivers 20 is identically configured although each receiver 20 has a unique Media Access Control (MAC) address associated therewith that will be used in the present invention as will be explained further below.

The present invention can include a Wi-fi device 30 to wirelessly communicate with receivers 20 and the internet. Wi-fi device 30 can be a dedicated device for use in the present invention, or can be an existing device (e.g., an existing wireless router and modem) without departing from the scope of the present invention. Wi-fi device 30 is placed in living space 100 to receive communications from all of receivers 20, and to transmit communications to a remote location hosting application processing software. Transmission of such communications can be via a global communications network such as the internet. Such W-fi devices are well-understood in the art and will not be explained further herein.

Figure 2:
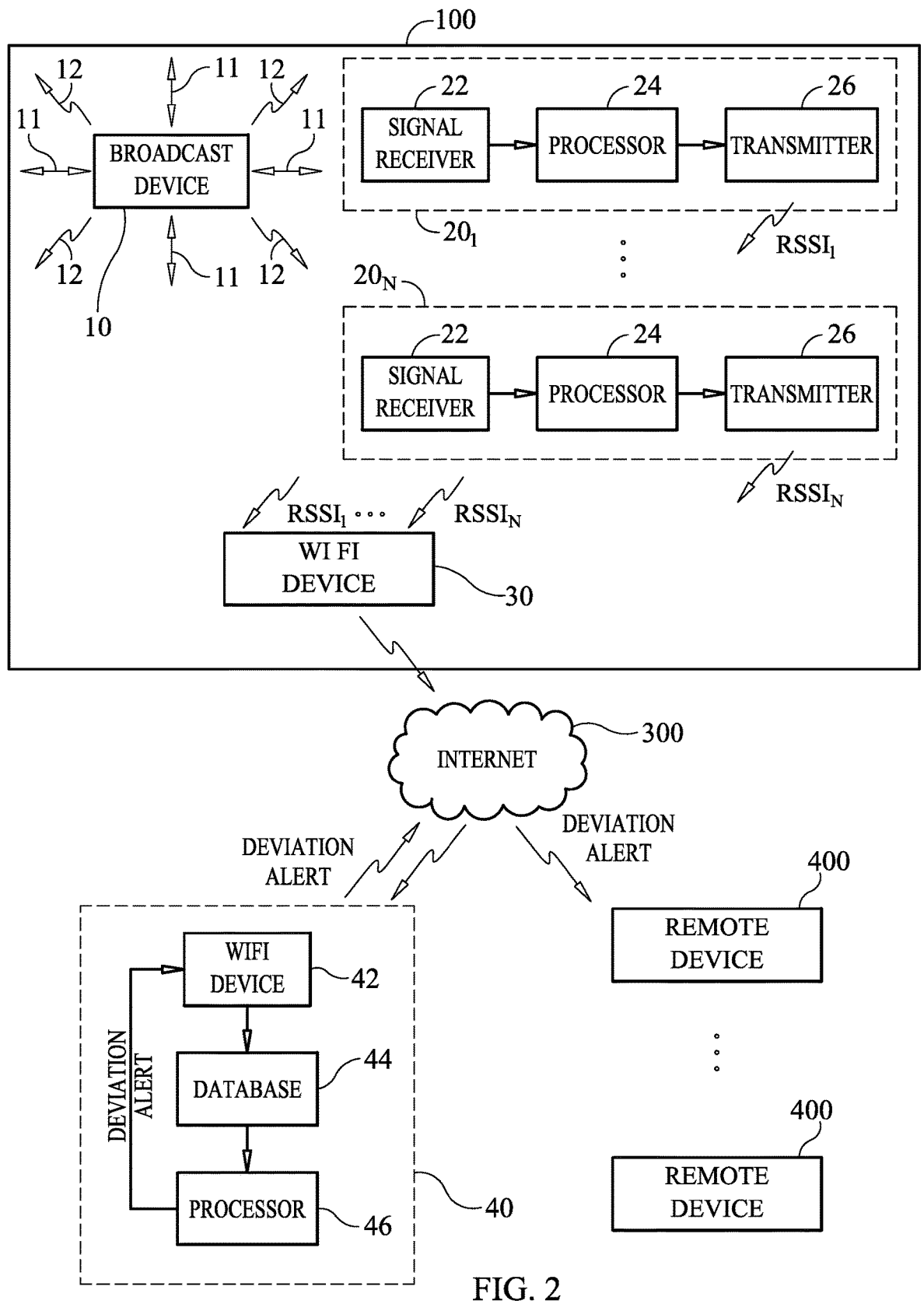
FIG. 2 is a schematic view of the beacon-generating device, stationary receiving devices, a remotely-located data processing facility, and remote devices that are to receive deviation alerts in accordance with an embodiment of the present invention.

Referring now to FIG. 2, living space 100 is shown with device 10 and receivers 20 disposed therein and illustrated in a schematic fashion. Located remotely with respect to living space 100 are a data processing facility 40 and one or more remote devices 400 that are configured to receive communications from facility 40 via the internet 300. Data processing facility 40 can include a Wi-fi device 42 (e.g., a modem for wireless connectivity to/with the internet 300), a database 44, and a processor/memory 46. The memory portion of processor/memory 46 stores the application's computer readable instructions of the present invention, and the processor portion of processor/memory 46 executes the computer readable instructions. It is to be understood that Wi-fi device 42 would not be required for hardwire connections to the internet 300.

In general, facility 40 receives communications from Wi-fi device 30 via the internet 300, processes the data contained in those communications and, when deemed appropriate, transmits a deviation alert to one or more of remote devices 400 via the internet 300. The types of remote devices 400 can include, for example, smart phones, smart watches, tablets, computers, laptop computers, desktop computers, etc., the choice of which is not a limitation of the present invention. Accordingly, a deviation alert can be routed by processor/memory 46 to one or more of cell phone numbers and e-mail addresses. The cell phone number(s) and/or e-mail address(es) would be entered by users of the present invention in ways well understood in the art.

Prior to use of the present invention, an initial set-up operation is required. Briefly, a user positions receivers 20 within and throughout living space 100, identifies locations of receivers 20 within living space 100, and specifies cell phone number(s) and/or e-mail address(es) for parties that are to be notified with deviation alerts as will be explained further below. During such set-up, a user provides locations of receivers 20 to data processing facility 40 using, for example, a website that establishes and controls authorized use of the present invention in ways that are well understood in the art. More specifically, as each receiver 20 is positioned in living space 100 and is activated, the receiver's transmitted MAC address is provided to facility 40 and the user is prompted to enter the receiver's location (e.g., master bedroom, master bathroom, kitchen, etc.). This process is repeated for each receiver/location to define a receiver "mapping" for that particular user and their living space.

In operation, the present invention includes training features and monitoring features. The operation of broadcast device 10 and receivers 20 do not change for both training and monitoring. More specifically, during both training and monitoring, it is assumed that broadcast device 10 is co-located with the person being monitored (e.g., person 200) as described above. Broadcast device 10 transmits its omnidirectional wireless signal 12 as it moves (as indicated by two-headed arrows 11) throughout living space 100 and/or when it is stationary within living space 100. During both training and monitoring, each receiver 20 "listens" for signal 12 and generates/transmits a signal indicative of the strength of the received signal and its MAC address for receipt and retransmission by Wi-fi device 30. Since each receiver 20 is positioned at a known location, a receiver's MAC address also identifies the receiver's location in living space 100.

Each receiver 20 includes a signal receiver 22, a processor 24, and a wireless transmitter 26. As mentioned above, each receiver 20 is uniquely identifiable and locatable in living space 100 by its MAC address that is included with each wireless transmission output from transmitter 26. Each receiver 20 can be configured to perform its function periodically (e.g., generally ranging from every few seconds to every few minutes) with all receivers 20 being time synchronized. At each such "performance time" as it will be referred to hereinafter, a receiver's processor 24 determines a signal strength of signal 12 received by signal receiver 22 at that performance time. For example, processor 24 could determine a Received Signal Strength Indication or RSSI value. Transmitter 26 then wireless transmits the determined RSSI value along with the unique MAC address of that receiver 20. Accordingly, for each performance time where there are N uniquely identifiable receivers 20, N uniquely identifiable RSSI values (i.e., $RSSI_1$ through $RSSI_N$) are transmitted and then received at Wi-fi device 30.

Each performance time's signal strength values $RSSI_1$ through $RSSI_N$ are time stamped (with the performance time) and transmitted by Wi-fi device 30 to facility 40 via the internet 300. The time-stamped signal strength values are stored in database 44. The signal strength values are processed by processor 46 to generate training or trend data, and are processed by processor 46 for the purpose of monitoring current signal strength values for comparison to the trend data. That is, the current signal strength values are the ones received after trend data has been generated. It is to be understood that one or more databases and/or processors can be used to carry out the functions of database 44 and processor 46, respectively, without departing from the scope of the present invention.

For purposes generating trend data, the present invention executes a series of processing steps that will be explained with reference to FIG. 3. At step 500, each time-stamped set of RSSI values is normalized using a standard deviation value of the data set being collected. The normalized values for a particular performance time are then averaged over a defined trend-data-collection period at step 502. For example, if trend data is to be initially collected over a four-week period for an exemplary performance time of 3:00 PM, step 502 averages 28 sets (i.e., 4 weeks times 7 days/week) of normalized $RSSI_1$ through $RSSI_N$ values (i.e., the values associated with the 1 through N receivers 20) for the exemplary 3:00 PM performance time. Next, at step 504, a best-fit curve routine is applied to the averaged values for each performance time to generate an expected trend range of RSSI values for that particular performance time. Steps 500, 502 and 504 are repeated for each specified performance time (e.g., every X minutes) for each day of the week for the entire initial trend-data-collection period. It is to be understood that performance times could be divided up into categories without departing from the scope of the present invention. For example, categories could be weekdays and weekends for persons having different weekday and weekend routines, or individual days (i.e., Monday, Tuesday, etc.) for persons whose routines vary in known ways with the day of the week.

In addition to the initial time period for trend data collection, the present invention can continually update the trend data as indicated by step 506. That is, step 506 updates the trend data for a user by continually implementing steps 500, 502 and 504 after the initial trend-data-collection time period such that the time period associated with the stored trend data continually increases thereby allowing the trend data to evolve with subtle changes in the user's lifestyle. The initially collected and continually updated trend data are stored in database 44. Note that a complete recalibration of trend data may be required from time-to-time to reflect substantial changes to a person's routine, e.g., post-surgery rehabilitation, use of a mobility assistance device, etc.

After a sufficient amount of trend data is created over a continuous period of days, the trend data forms a user profile for person 200 to provide processor 46 with a learned data set representative of the typical daily lifestyle location and movements of person 200 within living space 100. Processor 46 compares incoming or current signal strength values to the user's trend data in order to determine if it is appropriate is issue/transmit a deviation alert over the internet 300 for receipt by one or more remote devices 400 that have been designated for association with person 200. For example, remote devices 400 will typically be those regularly used by a loved one of person 200. Additionally, or alternatively, remote devices 400 can include those regularly used by official agencies (e.g., first responders), medical personnel or facilities, or in-home care personal or facilities that are available on an "on call" basis.

For purposes of determining when to generate a deviation alert, the present invention can execute several types of operations in a parallel fashion. By way of example, a non-limiting set of possible operations will be explained with reference to FIG. 4. In one type of parallel operation, step 600 compares incoming RSSI values for a performance time and/or a number of successive performance times with the current expected trend range stored in database 44. For example, if the sets of received RSSI values for all receivers 20 remain constant over a number of successive periods, person 200 is assumed to be stationary. However, if the sets of RSSI values for receivers 20 are changing, person 200 is assumed to be moving. If an incoming RSSI value(s) falls outside of the expected trend range, a deviation alert is issued by processor 46 for transmission/routing over the internet 300 to one or more remote devices 400. For example, if the RSSI values indicate that the user has not moved from the bathroom for an extended period of time during a time that they are normally in the bathroom for only a brief period of time (e.g., in the middle of the night), a deviation alert can be issued to a loved one so they could check on person 200. In cases where the current RSSI values indicate that person 200 has left living space 100 at an odd time (e.g., the middle of the night), a deviation alert might additionally be routed to first responders for a wellness check.

In another type of parallel operation, step 602 monitors receivers 20 to assure that they are transmitting. If a receiver 20 is not transmitting, an alert can be sent to one or more of remote devices 400 which can include the installer/provider of the present invention. In still another type of parallel operation, step 604 can monitor a specific receiver's (or receivers') RSSI values at specific periods of time. For this type of operation, one or more of receivers 20 could be programmed with times at which a particular receiver should detect a strong signal from the user's broadcast device 10. For example, if a user is scheduled to take medications at specified times and a receiver 20 located in proximity to the medicine storage location does not detect a strong signal from broadcast device 10 at the specified times or within an acceptable plus/minus deviation therefrom, an alert can be issued to indicate that the user might be missing their medication dosage(s). It is to be understood that additional or alternative parallel operations could be implemented without departing from the scope of the present invention.

The advantages of the present invention are numerous. The tracking system is completely passive in nature thereby empowering the user with their autonomy, while providing loved ones and/or health care professionals with a variety of non-invasive health-care monitoring operations. The nature of a deviation alert can be categorized and transmitted to one or more relevant parties to include a user's loved one(s), a user's medical professional(s), local first responders, and/or the installer/provider of the present invention.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A passive indoor tracking system for generating movement trends and alerts indicative of deviations therefrom associated with a person living in a residence, said system comprising:

a transmitter adapted to be co-located with a person living in a residence, said transmitter generating an omnidirectional wireless signal;

a plurality of receivers adapted to be disposed in the residence and distributed at stationary locations throughout the residence, each of said receivers generating a Received Signal Strength Indication (RSSI) value indicative of strength of said wireless signal received thereby at each of a plurality of specified times during each day; and a processor having a memory, said memory having computer readable instructions stored thereon that, when executed by said processor, cause said processor to perform the steps of enabling storage of each said RSSI value associated with each of said specified times for a plurality of days, wherein a plurality of RSSI values corresponding to each of said specified times for said plurality of days are stored for each of said receivers, generating, at a conclusion of said plurality of days, a trend RSSI value for each of said receivers for each of said specified times by averaging said plurality of RSSI values associated therewith and so-stored for each of said receivers, wherein a daily location and movement profile for the person living in the residence is defined by said trend RSSI value for each of said specified times at each of said receivers, and generating an alert when a subsequently-received RSSI value generated by at least one of said receivers following said plurality of days is indicative of a deviation from said daily location and movement profile.

2. A system as in claim 1, wherein said processor is accessible via the internet.

3. A system as in claim 1 wherein said memory further comprises instructions that, when executed by said processor, cause said processor to perform the step of generating an alert signal each time said alert is generated, said system further comprising a modem coupled to said processor and adapted to wirelessly transmit said alert signal via a communications network.

4. A system as in claim 1 wherein said memory further comprises instructions that, when executed by said processor, cause said processor to perform the step of routing said alert to at least one of a cell phone number and an e-mail address.

5. A system as in claim 1, further comprising a housing for mechanically supporting said transmitter, said housing adapted to be worn by the person.

6. A system as in claim 1, wherein each of said receivers has a unique Media Access Control (MAC) address associated therewith for transmission with each said RSSI value generated thereby.

7. A system as in claim 1 wherein said memory further comprises instructions that, when executed by said processor, cause said processor to perform the step of continually repeating, following said plurality of days, said steps of enabling storage and generating said trend RSSI value for each of said receivers for each of said specified times, wherein said daily location and movement profile is updated.

8. A system as in claim 1 wherein said memory further comprises instructions that, when executed by said processor, cause said processor to perform the step of monitoring said trend RSSI value for each of said receivers over a successive range of said specified times.

9. A system as in claim 1 wherein said memory further comprises instructions that, when executed by said processor, cause said processor to perform the step of monitoring said trend RSSI value for a specified one of said receivers over a selected successive range of said specified times.

10. A passive indoor tracking system for generating movement trends and alerts indicative of deviations therefrom associated with a person living in a residence, said system comprising:

a transmitter adapted to be co-located with a person living in a residence, said transmitter generating an omnidirectional wireless signal;

a plurality of receivers adapted to be disposed in the residence and distributed at known stationary locations throughout the residence, each of said receivers generating a Received Signal Strength Indication (RSSI) value indicative of strength of said wireless signal received thereby at each of a plurality of specified times during each day; and an internet-accessible processor having a memory, said memory having computer readable instructions stored thereon that, when executed by said processor, cause said processor to perform the steps of enabling storage of each said RSSI value associated with each of said specified times for a plurality of days, wherein a plurality of RSSI values are corresponding to each of said specified times for said plurality of days stored for each of said receivers, generating, at a conclusion of said plurality of days, a trend RSSI value for each of said receivers for each of said specified times by averaging said plurality of RSSI values associated therewith and so-stored for each of said receivers, wherein a daily location and movement profile for the person living in the residence is defined by said trend RSSI value for each of said specified times at each of said receivers, generating an alert when a subsequently-received RSSI value generated by at least one of said receivers following said plurality of days is indicative of a deviation from said daily location and movement profile, and routing said alert to at least one of a cell phone number and an e-mail address via the internet.

11. A system as in claim 10, further comprising a housing for mechanically supporting said transmitter, said housing adapted to be worn by the person.

12. A system as in claim 10, wherein each of said receivers has a unique Media Access Control (MAC) address associated therewith for transmission with each said RSSI value generated thereby.

13. A system as in claim 10 wherein said memory further comprises instructions that, when executed by said processor, cause said processor to perform the step of continually repeating, following said plurality of days, said steps of enabling storage and generating said trend RSSI value for each of said receivers for each of said specified times, wherein said daily location and movement profile is updated.

14. A system as in claim 10 wherein said memory further comprises instructions that, when executed by said processor, cause said processor to perform the step of monitoring said trend RSSI value for each of said receivers over a successive range of said specified times.

15. A system as in claim 10 wherein said memory further comprises instructions that, when executed by said processor, cause said processor to perform the step of monitoring said trend RSSI value for a specified one of said receivers over a selected successive range of said specified times.

16. A method of passively tracking movement trends and generating alerts indicative of deviations therefrom associated with a person living in a residence, said method comprising the steps of:

co-locating a transmitter with a person living in a residence, said transmitter generating an omnidirectional wireless signal;

distributing a plurality of receivers at known stationary locations throughout the residence, each of said receivers generating a Received Signal Strength Indication (RSSI) value indicative of strength of said wireless signal received thereby at each of a plurality of specified times during each day;

storing, via a database, each said RSSI value associated with each of said specified times for a plurality of days, wherein a plurality of RSSI values corresponding to each of said specified times for said plurality of days are stored for each of said receivers;

generating, via a processor coupled to said database at a conclusion of said plurality of days, a trend RSSI value for each of said receivers for each of said specified times by averaging said plurality of RSSI values associated therewith and so-stored for each of said receivers, wherein a daily location and movement profile for the person living in the residence is defined by said trend RSSI value for each of said specified times at each of said receivers, and generating, via said processor, an alert when a subsequently-received RSSI value generated by at least one of said receivers following said plurality of days is indicative of a deviation from said daily location and movement profile.

17. A method according to claim 16, wherein said processor is accessible via the internet.

18. A method according to claim 16, further comprising the steps of:

generating, via said processor, an alert signal each time said alert is generated; and transmitting, via a modem coupled to said processor, said alert signal via a communications network.

19. A method according to claim 16, further comprising the step of routing, via said processor, said alert to at least one of a cell phone number and an e-mail address.

20. A method according to claim 16, wherein said step of co-locating comprises the step of coupling said transmitter to the person via a wearable article mechanically supportive of said transmitter.

21. A method according to claim 16, wherein each of said receivers has a unique Media Access Control (MAC) address associated therewith for transmission with each said RSSI value generated thereby.

22. A method according to claim 16, further comprising the step of continually repeating via said processor, following said plurality of days, said steps of storing and generating said trend RSSI value for each of said receivers for each of said specified times, wherein said daily location and movement profile is updated.

23. A method according to claim 16, further comprising the step of monitoring, via said processor, said trend RSSI value for each of said receivers over a successive range of said specified times.

24. A method according to claim 16, further comprising the step of monitoring, via said processor, said trend RSSI value for a specified one of said receivers over a selected successive range of said specified times.

* * * * *